United States Patent [19]

Huber

[11] 4,135,768
[45] Jan. 23, 1979

[54] ACCELERATOR DEVICE FOR CONTROL VALVE OF AN AIR BRAKE SYSTEM FOR A RAILWAY VEHICLE

[75] Inventor: Johann Huber, Munich, Fed. Rep. of Germany

[73] Assignee: Knorr-Bremse GmbH, Munich, Fed. Rep. of Germany

[21] Appl. No.: 850,850

[22] Filed: Nov. 11, 1977

[30] Foreign Application Priority Data

Nov. 11, 1976 [DE] Fed. Rep. of Germany ....... 2651377

[51] Int. Cl.² .............................................. B60T 15/02
[52] U.S. Cl. ......................................... 303/68; 303/82
[58] Field of Search ...................... 303/82, 80, 40, 39, 303/68, 69

[56] References Cited

FOREIGN PATENT DOCUMENTS 967165 10/1957 Fed. Rep. of Germany ............. 303/82
2165144 3/1973 Fed. Rep. of Germany ............. 303/68

Primary Examiner—Galen L. Barefoot
Assistant Examiner—Reinhard J. Eisenzopf

Attorney, Agent, or Firm—Edmund M. Jaskiewicz

[57] ABSTRACT

An accelerator device for a three-pressure control valve of an air brake system on a railway vehicle has a control piston one side of which is subjected to air line pressure and the other side to pressure in a control chamber such that when the pressure in the control chamber predominates the control piston opens an accelerator valve between the air line pressure and a valve chamber. A monitor valve is between the valve chamber and a transfer chamber which continuously communicates to the atmosphere through a throttle orifice. A first piston operates the monitor valve and is subjected in the closing direction of the monitor valve to the action of braking pressure against the effect of a spring force. A second piston which is coupled to the first piston is loaded by air-line-pressure acting in the closing direction of the monitor valve against the pressure in a chamber which can be filled with air line pressure through a check valve opening in the direction of flow of the air line pressure and having a throttle orifice therein.

2 Claims, 1 Drawing Figure

U.S. Patent  Jan. 23, 1979  4,135,768
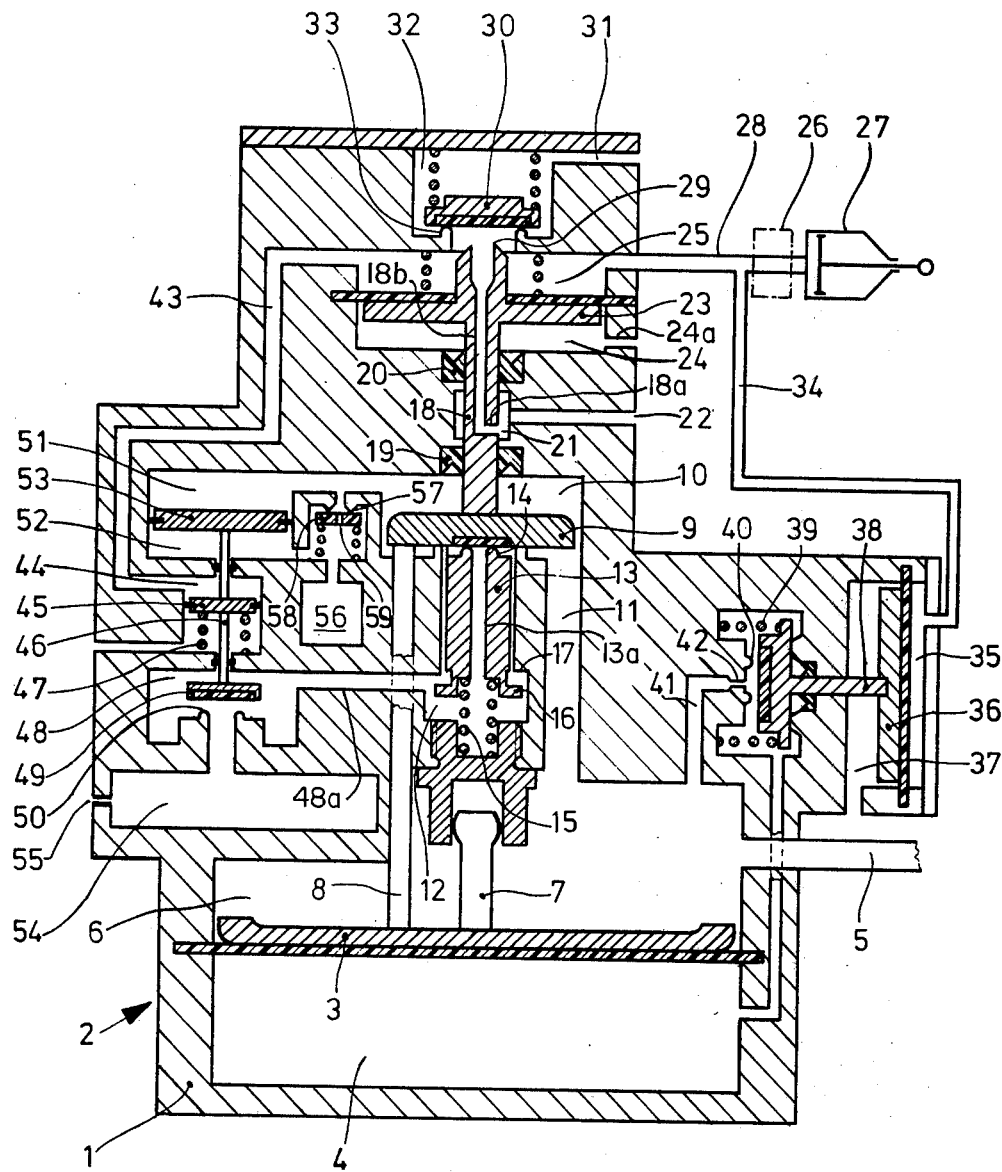

ACCELERATOR DEVICE FOR CONTROL VALVE OF AN AIR BRAKE SYSTEM FOR A RAILWAY VEHICLE

The present invention relates to an accelerator device for a three-pressure control valve of an air brake system in a railway vehicle, more particularly, to such an accelerator device which functions not only at the initiation of a braking operation but also during each successively introduced stage of the braking operation to tap air from the air line.

It is known to provide an accelerator device for a three-pressure control valve of a compressed-air brake system on railway vehicles wherein a control pressure is subjected to the action of air line pressure against the pressure of a control chamber and on predominant action of the pressure from the control chamber opens an accelerator valve between a chamber carrying the air line pressure and a valve chamber. A monitor valve is positioned between the valve chamber and a transfer chamber which is in constant communication with the atmosphere through a throttle orifice. The monitor valve is operated by a first piston which in the closing direction of the monitor valve is subjected to the action of braking pressure or a pressure proportional to such braking pressure against the force exerted by a spring.

Various forms of accelerator devices incorporating the concept as described above have been proposed such as, for example, in the German Pat. No. 967 165. In this accelerator device the control piston is connected through a curved plunger rod to a tubular valve element and the accelerator valve is positioned coaxially to the tubular valve element between the valve element and the control piston. The accelerator valve includes a sleeve urged by a spring against the end of the tubular valve which in turn is closed by a valve member. The interior of the sleeve can be connected by a monitor valve to a transfer chamber. According this particular accelerator device as disclosed in the German patent the sleeve is surrounded by an annular packing ring to which it is connected. The packing ring thus forms an outlet valve from the interior of the sleeve to the atmosphere together with a valve seat attached to the housing to define a double valve in combination with the accelerator valve. However, the oulet valve may be omitted as also proposed, for example, in the German Pat. No. 2 165 092.

Upon initiation of a braking operation, the accelerator valve of such known accelerator devices opens shortly after the control piston begins its stroke so that compressed air flows from the air line through the accelerator valve and the monitor valve opened by spring force into the transfer chamber. The compressed air thus removed from the air line assists in lowering the pressure therein which has the effect of intensifying the stroke of the control piston. Immediately after contact is established by the braking element and as soon as a predetermined level of braking force has been attained, the monitor valve will be closed and the transfer chamber is then vented through a throttle orifice to the atmosphere. During any introduction of additional braking stages during this braking operation previously known accelerator devices are not ready to tap again air from the air line in order to accelerate the braking operation. The prior art accelerator devices are again ready for action only after the brake has been fully released and the monitor valve is again opened after which the accelerator valve is closed.

In German Pat. No. 1 236 551 there is disclosed an accelerator device wherein the accelerator valve which is combined in a three-pressure control valve can be operated by a separate piston. This piston has a chamber on one side which is subjected to the action of pressure in the air line so that the piston is urged against the force of a spring. This chamber can be filled with air under pressure from the air line through a throttle opening and is connected through check valves that open in the direction of flow of air from the air line to the control chamber of the piston in addition to an auxiliary air reservoir. In any event, because of dependent action of the monitor valve this accelerator device also is capable of tapping air from the air line only at the beginning of a braking operation in order to accelerate the initiation of the braking operation. Tapping of air during subsequent braking stages once the braking operation is initiated is not possible.

It is therefore the principal object of the present invention to provide a novel and improved accelerator device for a three-pressure control valve of an air brake system for a railway vehicle.

It is another object of the present invention to provide such an accelerator device which operates not only at the initiation of a braking operation to tap compressed air from the air line but also operates during each subsequently introduced stage of the braking operation so that each stage of braking is accelerated.

The present invention essentially comprises a second piston which is operatively connected to the first piston of an accelerator device as described above. The second piston, at least when the accelerator valve is opened, is loaded by air line pressure acting in the closing direction of the monitor valve against the pressure in a chamber which can be filled with air line pressure through a check valve opening in the direction of flow of the air line pressure. The check valve can be by-passed by a throttle orifice.

According to one aspect of the present invention such an accelerator device may comprise a control piston having on one side a first chamber connected to an air line and a second side which defines a second or control chamber. An accelerator valve is provided in a first passage between a valve chamber and the control chamber and the accelerator valve is operable to an open position by the control piston. A monitor valve is provided in a second passage between the valve chamber and a transfer chamber which is continuously open to the atmosphere through a throttle orifice. A first piston, operatively connected to the monitor valve, and has one side thereof communicating to a source of braking pressure. A second piston is connected to the first piston and has one side communicating with the first chamber of the control piston. The second piston has a third chamber on one side thereof and is movable to close the monitor valve when its other side is subjected to air line pressure. A check valve is provided between the third chamber and the source of air line pressure.

The check valve may also be provided between the chambers formed on opposite sides of the second piston.

With the accelerator device of the present invention when a braking operation is initiated air is tapped from the air line through the accelerator valve and the monitor valve into the transfer chamber. But the monitor valve is opened by the second piston for a predetermined period of time also on each subsequently introduced braking stage so that air is tapped during each braking stage during that particular braking operation from the air line into the transfer chamber which in the meantime during each tapping is vented to the atmosphere.

Other objects and advantages of the present invention will be apparent upon reference to the accompanying description when taken in conjunction with the following drawing, which is exemplary, which illustrates schematically an accelerator device according to the present invention.

As may be seen in the drawing, a three-pressure control valve for a compressed-air braking system on a railway vehicle is indicated generally at 2 and has a housing 1 in which is mounted a control piston 3 which in this embodiment is constructed as a diaphragm piston to define on one side thereof a control chamber 4 and on the other side thereof a main air line chamber 6 connected to the main air line at 5. Extending axially from the central portion of the piston 3 is a plunger rod 7 which is slidably guided in a suitably shaped recess or bore formed in a portion of the housing 1 in order to guide accurately the sliding movement of the control piston 3.

A second plunger rod 8 extends from the control piston 3 and is radially disposed from the central plunger 7 so as to be eccentrically positioned on the control piston. The plunger rod 8 is slidably guided in the housing 1 and its other or upper end as viewed in the drawing is engageable with a valve member 9 disposed concentrically with respect to the control piston 3. The valve member 9 is positioned in a chamber 10 connected through a duct 11 to the air line chamber 6. A control sleeve 13 which is concentric to the control piston 3 is slidably and sealingly mounted in a recess or bore formed in the housing 1 and positioned between the line chamber 6 and chamber 10. The bore receiving the sleeve 13 is open toward the chamber 10 and defines therein a valve chamber 12. The upper end of the control sleeve 13 has a valve seat 14 thereon which is engageable with a packing on the valve member 9 and has extending therethrough a longitudinal passage 13a. The valve seat 14 and valve member 9 form an accelerator valve 9, 14.

A compression spring 15 is mounted between the bottom of the valve chamber 12 and the end of the control sleeve 13 which is away from the valve member 9. This other or lower end of the control sleeve 13 is provided with an annular flange 16 which is spaced a short distance from an abutment or stop surface 17 formed in the housing 1 and disposed laterally a short distance from the valve seat 14.

On the side of the valve member 9 away from the control sleeve 13 there extends axially a coaxially disposed tubular valve element 18 having a transverse bore 18a between two spaced sealing guides 19 and 20 mounted in the housing 1. The transverse bore 18a opens into a chamber 21 which is connected to the atmosphere through an outlet duct 22. Mounted on the upper end of the tubular valve element 18 is a piston 23 which defines on one side thereof a sub-chamber 24 and on its other side thereof a sub-chamber 25. The sub-chamber 24 which faces toward the valve member 9 continuously communicates to the atmosphere through an opening 24a. The sub-chamber 25 is connected through a pipe or passage 28 through a relay valve 26, indicated by dashed lines, to a brake cylinder 27. The tubular valve element 18 is provided with a longitudinal passage 18b which communicates between the transverse bore 18a and the upper end of the valve element 18 and surrounding this opening there is a valve seat 29 located in the sub-chamber 25. The valve seat 29 is engageable with a double plate valve member 30 located in a chamber 32 which is connected through a passage 31 to an auxiliary air reservoir which is not shown. The valve member 30 is engageable with a valve seat 33 formed on a portion of the housing 1 to define an inlet valve 30, 33 which monitors the passage of air from the chamber 32 into the sub-chamber 25. The valve member 30 together with the valve seat 29 forms an outlet valve 29, 30 which monitors communication between the sub-chamber 25 and the atmosphere.

A conduit or pipe 34 which is preferably formed in a portion of the housing 1 although illustrated for clarity as detached from the housing connects the sub-chamber 25 to a chamber 35. The chamber 35 is defined on one side of a piston 36 which defines on its other side a chamber 37 which is in continuous communication with the atmosphere. The piston 36 operates a plunger rod 38 which operates a valve 40 urged in the open direction by a spring 39. The valve 40 functions to open and close a passage 41 which leads from the line chamber 6 to the control chamber 4. A throttle or constriction 42 is provided in the passage 41 and the cross-sectional area of this throttle can be selected to establish the sensitivity or rate of flow between these chambers.

A duct or passage 43 formed in the valve housing 1 connects the sub-chamber 25 to a chamber 44 in which is mounted a piston 45 the other side of which is continuously subjected to atmospheric pressure. The piston 45 is provided with a coaxial axially extending plunger 46 which extends on both sides of the piston. On the side of the piston 45 subjected to atmospheric pressure there is located a spring 47 which acts upon the piston. Both sides of the plunger 46 are slidably and sealingly disposed in portions of the housing 1 and the lower end of the plunger 46 extends into a chamber 48 and is connected to a valve member 49 engageable with a valve seat 50 to define a monitor valve 49, 50. The other or upper end of the plunger 46 is connected to a second piston 53 which defines on one side thereof a chamber 51 and on the other side thereof a chamber 52. The monitor valve 49, 50 is loaded in the opening direction by the spring 47 acting against the first piston 45 and monitors the connection between the chamber 48 and a transfer chamber 54 which is in continuous communication with the atmosphere through a constriction or throttle opening 55. The chamber 48 is connected directly to the valve chamber 12 by a passage 48a.

The chamber 51 which is further away with respect to the piston 45 is in continuous communication with the chamber 10 and thus also with the line chamber 6 and air line 5. The chamber 52 on the other or lower side of the piston 53 has its volume increased by connection to a chamber 56 formed in the housing 1 and through a check valve 57 to the other chamber 51. The check valve 57 opens in the direction of flow from chamber 51 to chamber 52 and is provided with a spring-biased plate valve member 58 within which is formed a throttle opening 59.

When the brake of the railway vehicle is ready for operation and is in its released position the components of the control valve 2 will be in their positions as shown in the drawing. The air line 5 and the auxiliary air reservoir, which is not shown but is connected to the conduit 31 are subjected to the action of compressed air and the line chamber 6 is filled with compressed air through the air line 5 and control chamber 4 is filled with compressed air through the passage 41 and valve 40 opened under the force of spring 39. The chambers 10 and 51 are similarly subjected to the action of air under pressure through the duct 11 and chamber 52 is also subjected to the action of air under pressure through the check valve 57. Transfer chamber 54 and the chamber 48 through the opened monitor valve 49, 50 are vented to the atmosphere together with the chamber 12. Accelerator valve 9, 14 is closed, inlet valve 30, 33 is also closed and the outlet valve 29, 30 is open. Accordingly, the brake cylinder 27 and chambers 25, 35 and 44 are vented to the atmosphere through the longitudinal passage 18b of the tubular valve element 18 and outlet duct 22.

When the pressure in the air line 5 is decreased in order to intiate a braking operation, this decrease of pressure is propagated into the line chamber 6 while the pressure in control chamber 4 remains because of the throttle opening 42. Since the pressure in control chamber 4 will thus be greater than the pressure in the line chamber 6, the control piston 3 will be displaced upwardly as viewed in the drawing in the direction of the chamber 6 such that the plunger rod 8 in engagement with valve member 9 will also move the valve member 9. The control sleeve 13 will follow the upward movement of the valve member 9 only for a short distance until its flange 16 abuts the shoulder 17 at which point the valve member 9 will be lifted from valve seat 14 while the control sleeve 13 remains stationary. The opening of accelerator valve 9, 14 will thus enable air under pressure to flow from the air line 5 and/or chamber 6 through passage 11, chamber 10 and through the control sleeve longitudinal passage 13a into valve chamber 12, chamber 48 and through the opened monitor valve 49, 50 into the transfer chamber 54.

The flow of air under pressure to the atmosphere through the accelerator valve 9,14 has the effect of rapidly increasing the rate of pressure decrease in line chamber 6 so that the lifting of the control piston 3 is intensified. During this lifting movement of control piston 3, the upper end of the tubular valve element 18 having valve seat 29 thereon will engage the valve member 30 to close outlet valve 29,30 and upon further movement of control piston 33 to open inlet valve 30,33. The opening of inlet valve 30,33 will enable air under pressure to flow from the auxiliary air reservoir through passage 31 into the chamber 25, into brake cylinder 27 and into chambers 35 and 44. The air flowing into chamber 35 will displace piston 36 to the left as viewed in the drawing and will close valve 40 so that the control chamber 4 will be shut off from the line chamber 6. Thus, the pressure prevailing in the control chamber 4 will remain during any subsequent stages of the braking operation.

When all of the different stages of the braking operation as contemplated by the operator have been completed, the pressure in air line 5 will be maintained constant by the operator's brake valve which is not shown but known in the art. The tapping or withdrawing of air under pressure from chamber 6 through the accelerator valve 9,14 into the transfer chamber 54 is substantially completed at such a point in time since the transfer chamber 54 is filled with air at the pressure of chamber 6 so that only a slight venting will occur through the orifice 55. Although check valve 57 is closed, the throttle opening 59 enables the pressure to be equalized between the chambers 51 and 52, bearing in mind that the pressure in chamber 51 was correspondingly decreased to the level of pressure in the line chamber 6. Upon effecting such pressure equalization to a predetermined extent, the piston 45 under the effect of pressure prevailing in chamber 44 will close monitor valve 49,50 as result of which transfer chamber 54 will be shut off from any further air to be supplied from chamber 6. Transfer chamber 54 is then vented through constricted orifice 55 into the atmosphere. As soon as a predetermined level of pressure has been attained in chamber 25 and brake cylinder 27, the pressure in chamber 25 will act upon piston 23 to press the tubular valve element 18 downwardly until the inlet valve 30,33 is closed. Outlet valve 29,30 remains closed. At this point there is attained an equilibrium of forces acting upon the control piston 3 and piston 23 and the braking position is maintained.

In the event that a greater braking effort is desired, the operator of the train moves his brake valve to introduce another braking stage which causes a further decrease of pressure in the air line 5. In response, there is a rapid decrease of pressure in the chamber 51 but the pressure in chamber 52 lags the pressure decrease in chamber 51 as result of the throttle orifice 59. The pressure decrease in chamber 51 results in the pressure in chamber 52 being dominant so as to move piston 53 upwardly which in turn opens monitor valve 49,50 against the load introduced through the piston 45. Opening monitor valve 49,50 will cause air under pressure to flow from line chamber 6 through the opened accelerator valve 9,14, into valve chamber 12, into the transfer chamber 54 which has in the meantime been vented through the constriction 55. There is thus a further tapping or withdrawing of air under pressure from the line chamber 6 as result of which the equilibrium of forces on the pistons 3 and 23 is disturbed. The inlet valve 30,33 opens as result of the upward displacement of the tubular valve element 18 and air under pressure flows from the auxiliary reservoir through passage 31 to increase pressure in the chamber 25 as well as to increase pressure in the brake cylinder 27 to increase the braking force.

After this stage of pressure decrease in air line 5 has been completed, the pressure prevailing in chamber 52 is immediately thereafter equalized through the constriction 59 to correspond to the pressure prevailing in the chamber 51. Accordingly, the piston 45 under the effect of the pressure exerted thereon in chamber 44 is moved downwardly to again close the monitor valve 49,50. This causes transfer chamber 54 to be again shut off from the line chamber 6 and the transfer chamber is vented to the atmosphere through the constriction 55. As soon as a suitable increase in pressure has been introduced into chamber 25 and brake cylinder 27, corresponding to the stage of braking, there is again a force equilibrium acting on the pistons 3 and 23 and the tubular valve element 18 is displaced downwardly until the inlet valve 30,33 is closed. At this point, the components are in the position for the completed stage of braking.

In the event additional stages of braking are introduced, the sequences of operation as described above are correspondingly repeated. Monitor valve 49,50 will be open at each braking stage as result of the pressure differential existing for a short time on the piston 53. The opening of the monitor valve will thus cause a certain quantity of air under pressure to be withdrawn or tapped from line chamber 6 into the transfer chamber 54 which each time is vented through its constriction 55.

As known in the art, release of the brakes upon completion of a braking operation is ordinarily carried out by increasing pressure in the air line 5. This increase in pressure is transmitted into the chamber 6 which moves the control piston 6 downwardly together with the tubular valve element 18 which opens the outlet valve 29,30. Chamber 25, brake cylinder 27 and chambers 35 and 44 are then vented to the atmosphere through the duct 22. The pressure increase introduced into the line chamber 6 through the air line 5 is quickly transmitted into the chamber 51 and opens the check valve 57 so that this pressure increase is also transmitted into the chamber 52. During the downward displacement of control piston 3, the valve member 9 engages control sleeve 13 to close accelerator valve 9,14. When the brake release operation has been completed, the spring 39 will again push valve 40 into its open position and spring 47 will again push monitor valve 49, 50 into its open position so that the three-pressure control valve is returned into the release position as illustrated in the drawings.

The displaceable mounting of control sleeve 13 in the valve housing 1 permits a loading of accelerator valve 9,14 in the closing direction only through the force exerted by the spring 15. This will avoid any overstressing of the accelerator valve 9,14 as might occur through forces exerted by the control piston 3.

It is also apparent that the control sleeve 13 can be provided with an outlet valve for the chamber 48 as, for example, disclosed in the German Pat. No. 967 165. With the exception that the chamber 48 is vented through such an additional venting valve in control sleeve 13 in the full release position of the control valve 2, the function of the control valve remains unchanged. In particular, the monitor valve 49,50 functions in the same manner as described above.

As a further modification, the chamber 51 can be separated from the chamber 10 and connected to the valve chamber 12. In the full release position of the control valve 2, chambers 51 and 52 will thus be empty. The chambers 51 and 52 will be rapidly subjected to the action of air under pressure only on the initiation of a braking operation after the accelerator valve 9,14 opens. This brings about an additional tapping of air under pressure from the line chamber 6. The subsequent functioning of accelerator valve 49,50 remains unchanged for this modification.

Thus it can be seen that the present invention has provided an accelerator device which accelerates braking action after each introduced stage of a braking operation in addition to the initiation of the braking operation. It is thus not necessary to return the control valve to the release position after a braking operation in order to provide for operation of the accelerator device. The result is an effective accelerating operation of the control valve and associated braking components upon the introduction of each stage of a braking operation.

It will be understood that this invention is susceptible to modification in order to adapt it to different usages and conditions, and accordingly, it is desired to comprehend such modifications within this invention as may fall within the scope of the appended claims.

What is claimed is:

1. In an accelerator device for a three-pressure control valve of an air brake system for a railway vehicle, the combination of a control piston having on one side thereof a first chamber connected to an air line and having on a second side thereof a second chamber, there being a valve chamber, means for defining a first passage between said valve chamber and said first chamber, an accelerator valve in said first passage and operable to an open position by said control piston, there being a transfer chamber having a throttle orifice communicating to the atmosphere, means for defining a second passage between said valve chamber and said transfer chamber, a monitor valve in said second passage, a first piston operatively connected to said monitor valve and having one side thereof communicating to a source of braking pressure, a second piston connected to said first piston and having a first side communicating with said first chamber of said control piston, said second piston movable to close said monitor valve when subjected to air line pressure, said second piston having a second side having a third chamber thereon, and a check valve between said third chamber and air line pressure from said first chamber of said control piston, there being a throttle orifice in said check valve.

2. In an accelerator device as claimed in claim 1 wherein there is on the first side of said second piston a fourth chamber and said check valve is between said third and fourth chambers so that said third chamber can be filled with air line pressure.

* * * * *